July 21, 1925.

O. EPPENSTEIN

TELEMETER

Filed Aug. 13, 1921

1,546,723

Inventor:
Otto Eppenstein

Patented July 21, 1925.

1,546,723

UNITED STATES PATENT OFFICE.

OTTO EPPENSTEIN, OF JENA, GERMANY, ASSIGNOR TO THE FIRM OF CARL ZEISS, OF JENA, GERMANY.

TELEMETER.

Application filed August 13, 1921. Serial No. 492,105.

(GRANTED UNDER THE PROVISIONS OF THE ACT OF MARCH 3, 1921, 41 STAT. L., 1313.)

*To all whom it may concern:*

Be it known that I, OTTO EPPENSTEIN, a citizen of the German Empire, residing at Jena, Germany, have invented a new and useful Telemeter (for which I have filed an application in Germany, March 28, 1918, August 9, 1918, and October 3, 1918), of which the following is a specification.

The present invention relates to a telemeter having the base-line either within the instrument or at the target, which telemeter serves for measuring the distance from aircrafts and is fitted with a deflecting device, adapted to change the relative position of two images of the object to be measured, which are presented to the observer.

Figure 1:
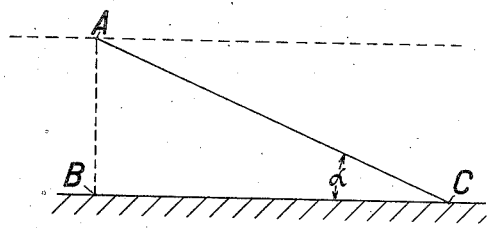
Figure 2:
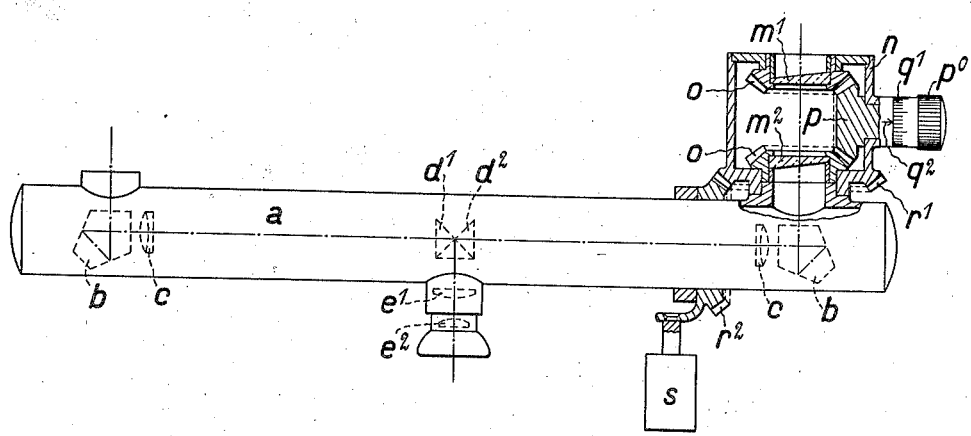

In the annexed drawing Fig. 1 is a diagram of the theoretical elements of the invention, Fig. 2 shows an example of the invention, partly in section.

As a rule, the measurement of the distance from air-crafts is rendered difficult owing to the comparatively quick change of this distance. In order to reduce this difficulty, the invention avails itself of the fact, that an air-craft generally moves in a horizontal plane, thus being at an invariable height above the observer, in such a way that the said deflecting device is so coupled to a body, the position of which relatively to the vertical line is invariable, that the relative position of the two images remains the same in the direction of the base-line if the telemeter is directed upon an object moving at invariable height. Hence, if the relative position of the two images corresponding to the measurement taken has once been attained, the said position of the two images is automatically maintained and the observer only need, at the most, remove, by actuating the deflecting device, those deviations of the relative position of the two images, caused by any possible change of height. In the new telemeter the desired independence of the relative position of the two images in the direction of the base-line is thereby attained that the deflecting device is so coupled to a body, the position of which relatively to the vertical line is invariable, that the effect of the deflecting device in the measuring plane changes with the sine of the angle at which the direction of look-out of the telemeter is inclined towards the horizontal line, consequently with the sine of the angle of sight of the object to be measured. As, according to Fig. 1 of the drawing, the height (A B) is equal to the product of the distance (A C) of the object to be measured and the sine of the angle of sight ($\alpha$) of the object to be measured, the distance being therefore equal to the quotient of the height and the sine of the angle of sight, the relative position of the two images with invariable height of the object to be measured is evidently maintained if the alteration of the angle of sight affects the action of the deflecting device in the same sense and to the same extent as the distance.

As in the new telemeter the relative position of the two images in the direction of the base-line does not change if the height of the object to be measured remains the same, whilst in the telemeters already known the said unchangeableness exists if the distance of the object to be measured remains unchanged, in the new telemeter the position of the deflecting device, imparted to it by its adjusting device, only affords in the first place the possibility of reading off the height of the object to be measured, but not its distance. The latter may, however, be easily ascertained if, apart from the height, the angle of sight of the object to be measured is determined; in addition, the distance can easily be read off by providing the telemeter, e. g. with a curve-table having an index, the position of which is, on the one hand, changed by the adjusting device and which, on the other hand, depends on the angle of sight available in the particular case.

The body, the position of which relatively to the vertical line is invariable, may, e. g., consist of a pendulum; in telemeters resting on a stand, the latter can also be used as the invariable body.

If the deflecting device consists of a pair of wedges, the members of which must be displaced relatively to each other in case the relative position of the two images is to be altered, the desired change of the effect of the said pair of wedges, the latter acting substantially as one wedge of variable amount of deflection, may also be attained by always keeping in a vertical position the plane, in which the whole deflection caused by the pair of wedges takes place (or, if the pair of wedges be disposed in front of the respective objective reflector system, the image of that plane produced by the said system). An alteration of elevation of the telemeter will then surely cause a change of the relative position of the two partial images in the vertical direction of the base-line, but the said change may be avoided by applying two deflecting devices and by causing the one device to act on the position of the one partial image, the other device on that of the other partial image. However, it must be seen to that the two devices act on the position of the images vertical to the direction of the base-line in the same direction, but in the direction of the base-line in the opposite direction. If the deflecting device be disposed behind one of the objectives, the desired change of the effect of this pair of wedges may also be attained by so regulating the distance between the latter and the focal plane of the appertaining objective, e. g. by means of a gearing acted upon by a pendulum, that the said distance is always equal to that existent with the angle of sight of 90°, multiplied by the sine of the angle of sight; in that case the relative position of the two images in the vertical direction of the base-line will not be affected. However, if the pair of wedges be disposed behind one of the objectives the desired effect may also be attained by so selecting the wedges that, when they are acting in the same plane but in the opposite direction, a traversing ray is allowed to emerge in its entrance direction and, furthermore, by so coupling the wedges to a body, the position of which relatively to the vertical line is invariable, that, in case of an alteration of elevation of the telemeter, they rotate opposed to each other by the angle of rotation of the telemeter relatively to the latter about an axis parallel to the base-line. By then disposing the said wedges in such a way that they will both lie each with the main section in the plane of the measuring triangle, if the telemeter be vertically directed upwards, and that they will then both act in the same sense, in the said position of the telemeter the total deflection of the respective ray pencil system caused by the pair of wedges takes place in the measuring plane and it also takes place in this plane owing to the symmetrical rotation of the two wedges in any other position of the telemeter. Moreover, the said effect is decreasing, on the telemeter passing from the first mentioned position into another by the cosine of the angle by which the direction of look-out departs from the vertical line; hence, it is always the same proportion with the sine of the angle of sight. The desired object is therefore attained without altering the relative position of the two images vertically to the direction of the base-line. In any case it must be seen to that for an infinitely distant object to be measured with each angle of sight the value of the effect of the deflecting device is equal to zero. This must take place because with any angle of sight an infinitely large height is due to an infinitely distant object to be measured and the condition to be satisfied in the new telemeter, that the relative position of the two images in the direction of the base-line be maintained, if the telemeter with invariable height of the object to be measured be directed to it, is turned in that case into the condition that the relative position of the two images in the direction of the base-line be maintained with any angle of sight of the object to be measured. Therefore provision should be made that the pair of wedges will not have a deflecting effect when the adjustment for an infinitely distant object to be measured has taken place.

Fig. 2 of the drawing represents as a constructional example of the invention a monocular telemeter, partly in section and partly as a front view and directed to an object with an angle of sight of 90°, viz to an object just above the observer. In a casing $a$ there are disposed two optical square prisms $b$, two objectives $c$ and a system of separating prisms $d^1$, $d^2$; the ocular lenses of the telemeter are marked $e^1$ and $e^2$. The measuring device contains two refractive wedges $m^1$ and $m^2$ which are rotatably supported in a body $n$ and which may be displaced relatively to each other by means of two conical wheels $o$, in which engages a conical wheel $p$. The latter is actuated by means of a knob $p^0$, provided with a range scale $q^1$; the index $q^2$ of the latter is fixed to the body $n$.

The said body $n$ is rotatable about the right entrance axis of the telemeter and is provided with a bevel wheel gearing $r^1$. In the latter there engages a conical wheel $r^2$ with the same number of teeth, which is rotatable about the body of the telemeter $a$ and provided with a weight $s$. By turning the telemeter from the position shown about its longitudinal axis with a view to direct it to an object, the angle of sight of which is smaller tan 90°, the said rotating motion is not shared by the weight $s$ but the latter remains in its position relatively to the vertical line. Owing to the co-operation of the conical wheel $r^2$ with the gearing $r^1$, the body $n$ along with the wedges $m^1$ and $m^2$ rotates relatively to the body of the telemeter $a$ by the same angle by which the direction of look-out departs from the vertical line. Hence, the deflecting effect produced by the pair of wedges $m^1$, $m^2$ in the measuring plane is reduced in such a way as to be always equal to the effect present at the angle of sight of 90°, multiplied by the sine of the angle of sight. To the relative position of the wedges $m^1$ and $m^2$ shown in the drawing there applies the range indication "infinity"; in this position the pair of wedges acts as a plano-parallel plate.

In the example a rotation of the telemeter about its longitudinal axis produces a (undesirable) relative displacement of the two images to be measured in the height-direction. This deficiency could be removed by also disposing on the left of the telemeter a corresponding pair of wedges, which acts, however, in the opposite way in the height-direction, and by coupling both pairs of wedges to each other.

I claim:

In a telemeter rotatable about an axis parallel to its base-line, a deflecting device adapted to alter the relative position of two images of the object to be measured, which are presented to the observer, the said deflecting device consisting of a pair of wedges, the two members of which being rotatable relatively to each other, a body, the position of which relatively to the vertical line is invariable and which imparts, on the telemter being rotated, to the wedges a common rotation relatively to the telemeter about the same angle as the telemeter.

OTTO EPPENSTEIN.

Witnesses:
PAUL KRUGER,
RICHARD HAHN.